US006129370A

United States Patent [19]

Hsieh et al.

[11] Patent Number: 6,129,370

[45] Date of Patent: Oct. 10, 2000

[54] FOOTREST OF BICYCLE

[76] Inventors: Te-Tsai Hsieh, 23 Alley 11, Lane 250, Chung Hua See Road, Chan Hua City; Chin-Feng Lin, 88 Chang An Lane, Show Sway Hslang, Chan Hua Hsien, both of Taiwan

[21] Appl. No.: 09/339,037

[22] Filed: Jun. 23, 1999

[30] Foreign Application Priority Data

Nov. 25, 1998 [TW] Taiwan ................................ 07219578

[51] Int. Cl.[7] ..................................................... B62J 25/00

[52] U.S. Cl. ............................. 280/291; 74/560; 74/563; 74/564

[58] Field of Search .............................. 280/291; 74/560, 74/563, 564

[56] References Cited

U.S. PATENT DOCUMENTS

| | | | |
|---|---|---|---|
| 3,484,829 | 12/1969 | Erickson | 280/291 |
| 3,531,138 | 9/1970 | Sorensen | 280/291 |
| 3,755,050 | 8/1973 | Golden et al. | 161/2 |
| 3,893,747 | 7/1975 | Nagel | 359/521 |
| 4,445,397 | 5/1984 | Shimano | 74/560 |
| 4,462,604 | 7/1984 | Meyer | 280/250.1 |
| 4,591,179 | 5/1986 | Nakamura | 280/291 |
| 4,797,791 | 1/1989 | Burchick | 362/473 |
| 4,989,890 | 2/1991 | Lockard et al. | 280/42 |
| 5,454,580 | 10/1995 | Lin | 280/291 |
| 5,482,307 | 1/1996 | Lin | 280/291 |

*Primary Examiner*—Brian L. Johnson
*Assistant Examiner*—Deanna Draper
*Attorney, Agent, or Firm*—Bacon & Thomas, PLLC

[57] ABSTRACT

A bicycle footrest of a hollow tubular construction is fastened pivotally with the spindle of a bicycle fork tip and provided with a skid proof outer surface which is in turn provided with a plurality of retaining grooves arranged at an interval for retaining a plurality of C-shaped rings of a fluorescent material, elastic O rings of a fluorescent material, fluorescent paper strips, or reflecting paper strips.

10 Claims, 3 Drawing Sheets

5
2A
2
6C
6E
6A
6
1
24
11

2
2B
2
24
6

FOOTREST OF BICYCLE

FIELD OF THE INVENTION

The present invention relates generally to a bicycle, and more particularly to a footrest of the bicycle.

BACKGROUND OF THE INVENTION

The conventional footrest of the bicycle is generally mounted on the spindle of the front fork tip or rear fork tip of a bicycle. The footrest is provided in the outer surface thereof with a plurality of skid proof embossed portions.

Such a conventional footrest of the bicycle as described above is defective in design in that it is a safety hazard in light of the footrest extending out from the bicycle frame, and that it undermines the esthetic effect of the bicycle, and further that it must be fastened or unfastened with the hand tool.

SUMMARY OF THE INVENTION

It is therefore the primary objective of the present invention to provide the bicycle with an improved footrest which can be folded so as to avoid being a safety hazard.

It is another objective of the present invention to provide the bicycle with an improved footrest which does not compromise the overall esthetic effect of the bicycle.

It is still another objective of the present invention to provided the bicycle with an improved footrest which can be fastened or unfastened without the use of a hand tool.

In keeping with the principle of the present invention. The foregoing objectives of the present invention are attained by a footrest which is of a hollow tubular construction and is fastened with the spindle of the front fork tip or rear fork tip of a bicycle. The tubular footrest is provided with an embossed outer surface to afford a skid proof effect. The footrest is provided at the outer end thereof with a cap of a fluorescent material and thus capable of giving off the fluorescent light as a warning light in the dark or at a poorly-lit place. The footrest is fastened at one end thereof with the spindle of the bicycle fork tip by means of a pivoting seat, thereby enabling the footrest to be adjustably turned. The footrest is further provided in the outer surface thereof with a plurality of retaining grooves which are arranged at an interval for retaining a C-shaped ring of a fluorescent material and capable of giving off the fluorescent light serve to reinforce the fluorescent waning effect of the cap of the footrest.

The foregoing objectives, features, functions, and advantages of the present invention will be more readily understood upon a thoughtful deliberation of the following detailed description of a preferred embodiment of the present invention with reference to the accompanying drawings.

DETAILED DESCRIPTION OF THE EMBODIMENT

Figure 1:
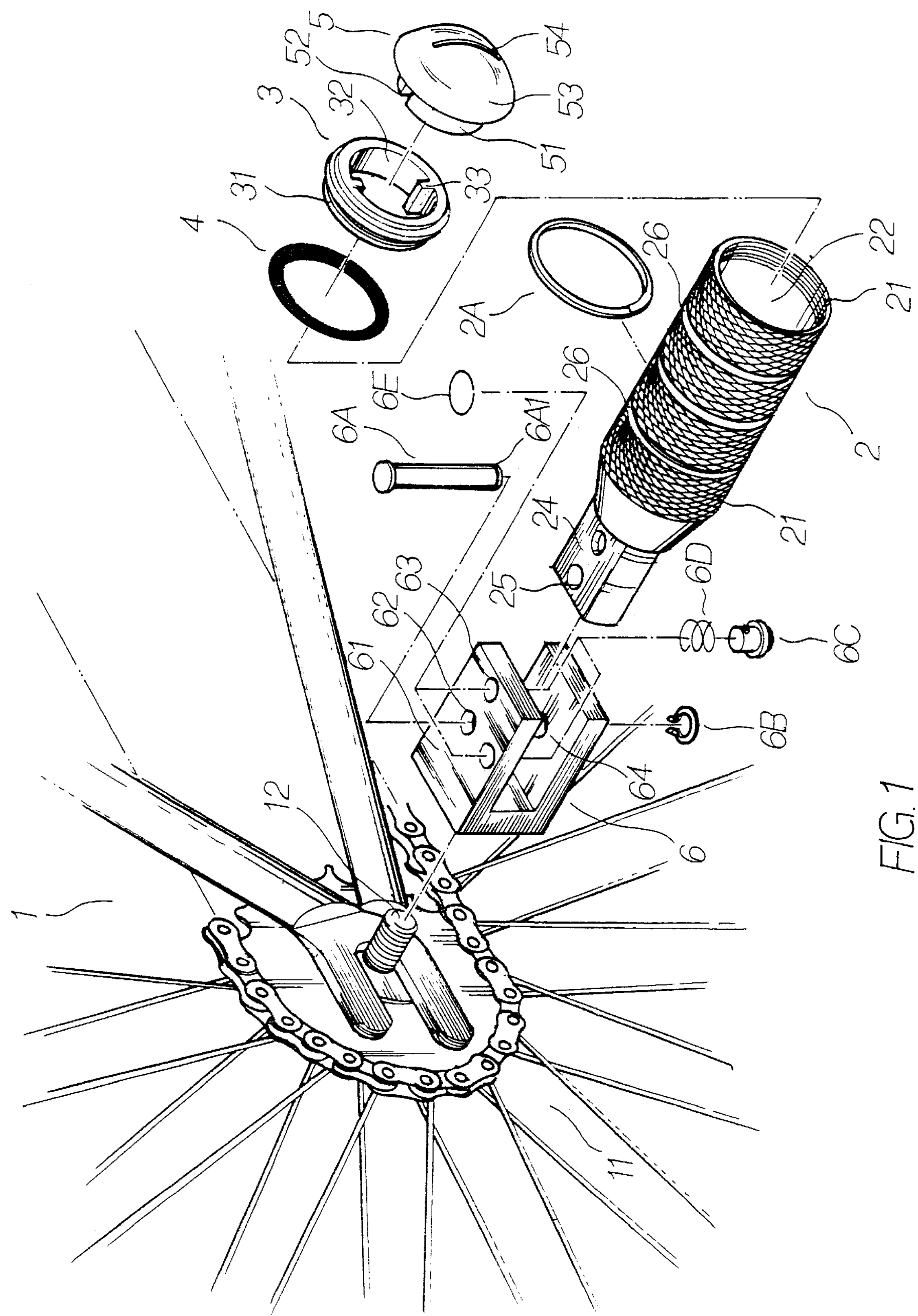
FIG. 1 shows and exploded view of a bicycle footrest embodied in the present invention.
Figure 2:
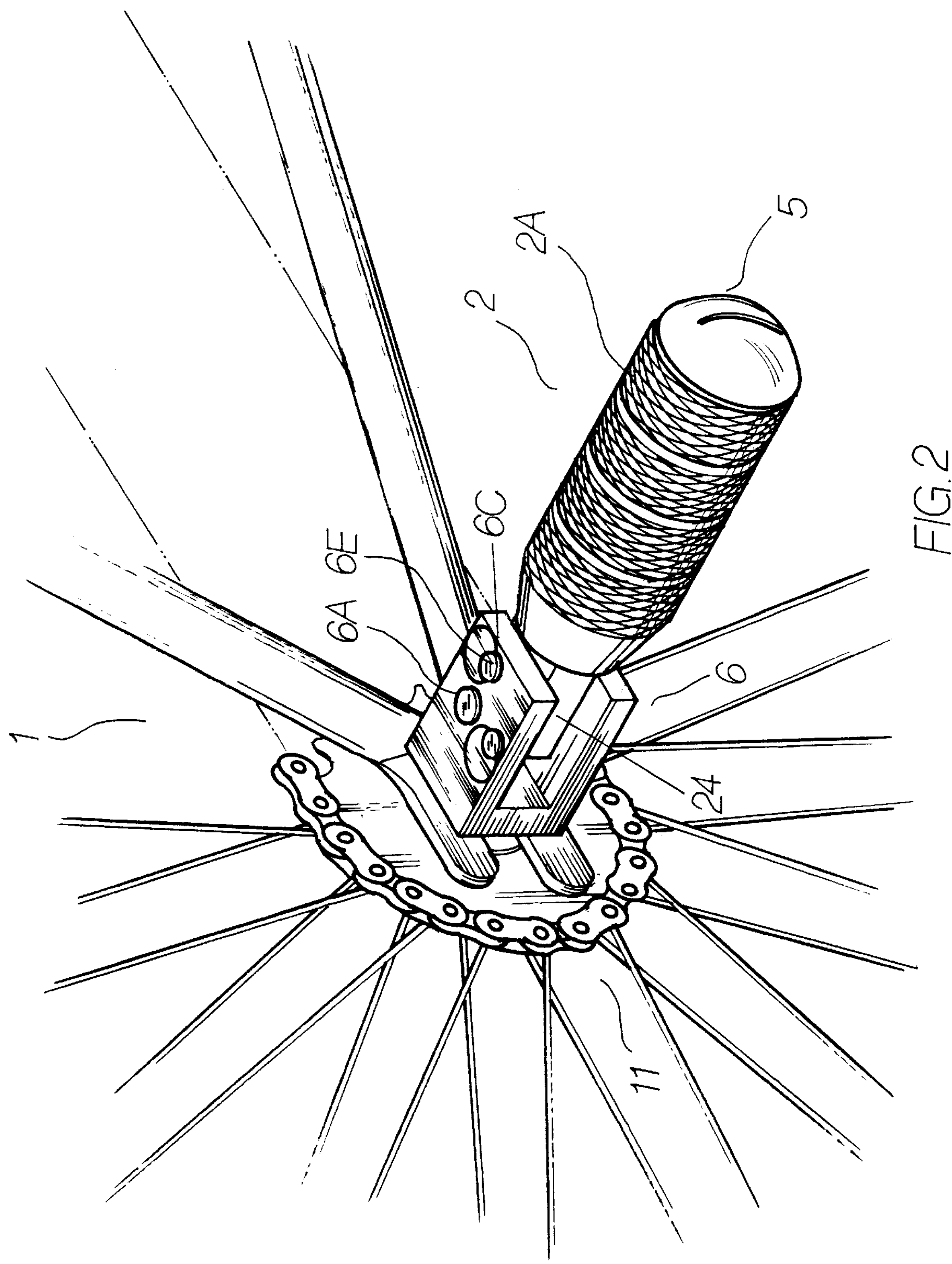
FIG. 2 shows a perspective view of the bicycle footrest of the present invention which is fastened pivotally with the spindle of a bicycle rear fork tip.

As shown in FIGS. 1 and 2, a footrest 2 embodied in the present invention is of a hollow tubular construction and is provided in the outer surface thereof with a plurality of embossed areas 21 and retaining grooves 26 located between the two embossed areas 21. The embossed areas 21 are intended to provide the footrest 2 with a skid proof effect. The retaining grooves 26 serve to retain a C-shaped ring 2A made of a fluorescent material to provide a warning light in the dark or in a poorly-lit place. The retaining grooves 26 can retain a plurality of fluorescent or reflecting paper strips. The footrest 2 is provided at one end thereof with a fastening end 24 having a plurality of fastening through holes 25. The fastening end 24 of the footrest 2 is fastened pivotally with the spindle 12 of a rear fork tip 11 of a bicycle 1 by means of a pivoting seat 6 has two arms 61 which are respectively provided with a plurality fastening holes 62 and adjusting holes 63, which are corresponding in location to the fastening through holes 25 of the fastening end 24 of the footrest 2. Located between the two arms 61 of the pivoting seat 6 is a receiving space 64 in which the fastening end 24 of the footrest 2 is received such that the fastening end 24 is fastened pivotally with the pivoting seat 6 by a pivot 6A which is received in the fastening hole 62 and the through hole 25. The pivot 6A is provided at one end thereof with a retaining groove 6A1 for retaining a C-shaped retaining ring 6B. The pivoting seat 6 is fastened with the spindle 12 of the rear fork tip 11 of the bicycle 1.

The hollow tubular footrest 2 is provided at the free end 22 thereof with inner threads 23, a fitting nut 3, a washer 4, and a cap 5. The fitting nut 3 is provided with outer threads 31 and a protrusion 33. The cap 5 is made of a fluorescent material and is provided with a projection 51 having a slot 52 corresponding in location to the protrusion 33. The projection 51 is elastic and is provide in the outer ends thereof with a protruded ring 55. The cap 5 is provided in the outer side 53 thereof with a slit 54. The fitting nut 3 is received in the free end 22 of the footrest 2 in conjunction with the washer 4 such that the outer threads 31 of the fitting nut 3 are engaged with the inner threads 23 of the footrest 2. The cap 5 is retained by the fitting nut 3 such that the slot 52 of the cap 5 retains securely the protrusion 33 of the fitting nut 3. The cap 5 serves to provide the footrest 2 with a fluorescent warning light.

Figure 3:
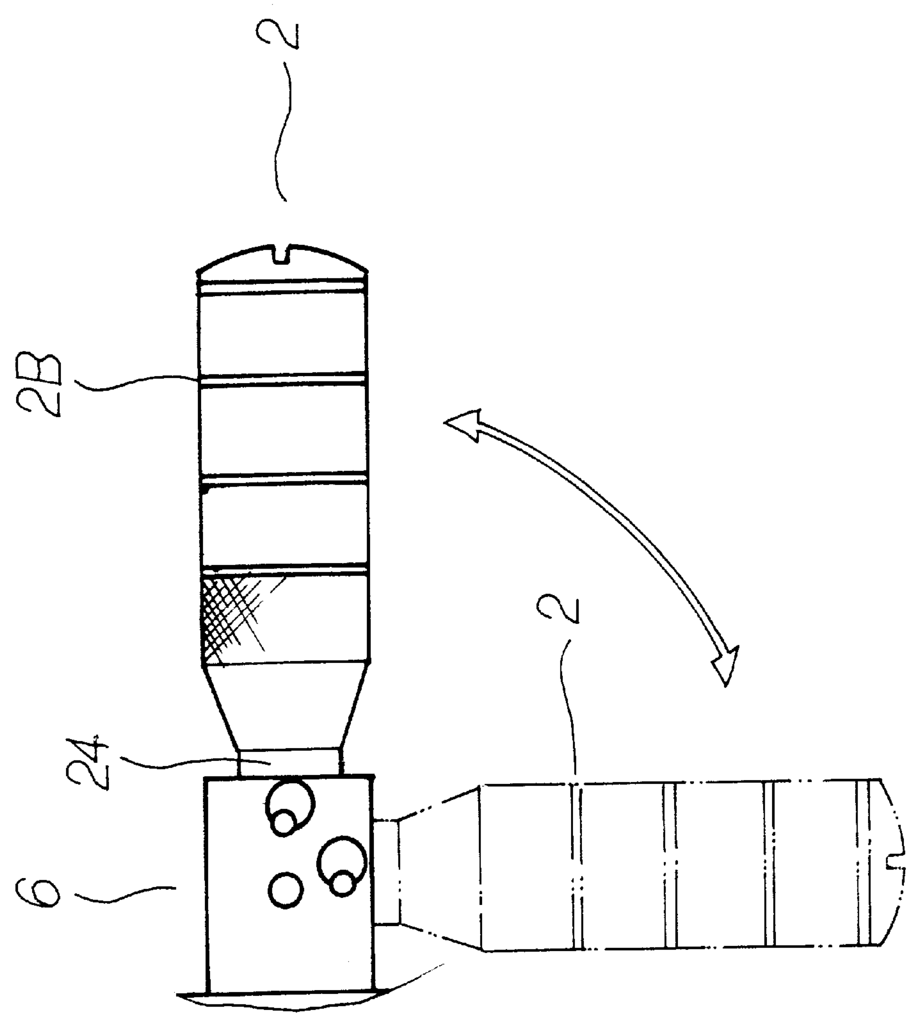
FIG. 3 shows a schematic view illustrating the rotation of the footrest of the present invention in relation to the spindle of the bicycle rear fork tip.

As shown in FIG. 3, the footrest 2 of the present invention can be swiveled on the pivot 6A. Upon being swiveled, the footrest 2 is confined by a confining bolt 6C which is fitted into a coil spring 6D and received in the adjusting hole 63 of the pivoting seat 6 in conjunction with a ring 6F, which serves to enable the confining bolt 6C to move away from the through hole 25 of the footrest 2 at the time when the footrest 2 is turned.

In order to enhance the esthetic effect of the footrest 2 of the present invention, the cap 5 an the C-shaped rings 2A may be made of fluorescent materials of various colors. In addition, the C-shaped rings 2A may be replaced by a plurality of elastic O-rings 2B of a fluorescent material, as shown in FIG. 3. Moreover, the C-shaped rings 2A may be replaced by a plurality of fluorescent paper strips or reflecting paper strips.

In light of the footrest 2 of the present invention being hollow, the footrest 2 may be used as a container to hold small hand tools for fixing the bicycle

What is claimed is:

1. A bicycle footrest of a hollow tubular construction and fastened pivotally with the spindle of a bicycle fork tip, said footrest provided with an embossed outer surface to provide a skid proof effect; wherein said outer surface of said footrest is provided with a plurality of retaining grooves which are arranged at an interval and each retain a ring of a fluorescent material.

2. The bicycle footrest as defined in claim 1, wherein said rings are elastic O-rings of a fluorescent material.

3. The bicycle footrest as defined in claim 1, wherein said rings are fluorescent or reflecting paper strips.

4. The bicycle footrest as defined in claim 1, wherein said rings are C-shaped.

5. The bicycle footrest as defined in claim 1 wherein the footrest is pivotally fastened to a pivoting seat which is fixed to the spindle; said pivoting seat including an upper arm and a lower arm with a space therebetween for pivotally receiving a fastening end of the footrest.

6. The bicycle footrest as defined in claim 5 further comprising a pivot pin extending between the upper and lower arms of said pivoting seat and through a hole in the fastening end of the footrest for pivotally securing the footrest to the pivoting seat.

7. The bicycle footrest as defined in claim 6 further comprising at least one spring-loaded confining bolt arranged on said pivoting seat for releasably locking the footrest into position.

8. The bicycle footrest as defined in claim 7, wherein said rings are elastic O-rings of a fluorescent material.

9. The bicycle footrest as defined in claim 7, wherein said rings are fluorescent or reflecting paper strips.

10. The bicycle footrest as defined in claim 7, wherein said rings are C-shaped.

* * * * *